United States Patent
Jackson

(10) Patent No.: US 8,271,980 B2
(45) Date of Patent: Sep. 18, 2012

(54) SYSTEM AND METHOD OF PROVIDING SYSTEM JOBS WITHIN A COMPUTE ENVIRONMENT

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 456 days.

(21) Appl. No.: 11/718,867

(22) PCT Filed: Nov. 8, 2005

(86) PCT No.: PCT/US2005/040669
§ 371 (c)(1),
(2), (4) Date: May 8, 2007

(87) PCT Pub. No.: WO2006/053093
PCT Pub. Date: May 18, 2006

(65) Prior Publication Data
US 2008/0072230 A1    Mar. 20, 2008

Related U.S. Application Data

(60) Provisional application No. 60/625,894, filed on Nov. 8, 2004.

(51) Int. Cl.
*G06F 9/46* (2006.01)
(52) U.S. Cl. .................. 718/100; 718/102; 718/104
(58) Field of Classification Search .................. 719/310, 719/314–316, 318; 718/1, 100, 101, 102, 718/104, 106; 709/201, 229, 238
See application file for complete search history.

(56) References Cited

U.S. PATENT DOCUMENTS

| | | | | |
|---|---|---|---|---|
| 5,594,901 A | * | 1/1997 | Andoh | 718/104 |
| 5,752,030 A | * | 5/1998 | Konno et al. | 718/102 |
| 6,003,061 A | * | 12/1999 | Jones et al. | 718/104 |
| 6,058,416 A | * | 5/2000 | Mukherjee et al. | 709/203 |
| 6,092,178 A | * | 7/2000 | Jindal et al. | 712/27 |
| 6,108,662 A | * | 8/2000 | Hoskins et al. | 707/102 |
| 6,202,080 B1 | * | 3/2001 | Lu et al. | 718/105 |
| 6,263,359 B1 | * | 7/2001 | Fong et al. | 718/103 |
| 6,345,287 B1 | * | 2/2002 | Fong et al. | 718/102 |
| 6,366,945 B1 | * | 4/2002 | Fong et al. | 718/104 |
| 6,405,234 B2 | * | 6/2002 | Ventrone | 718/102 |

(Continued)

OTHER PUBLICATIONS

Tanaka et al. "Resource Manager for Globus-Based Wide-Area Cluster Computing", 1999 IEEE, 8 pages.*

(Continued)

*Primary Examiner* — Van Nguyen
(74) *Attorney, Agent, or Firm* — Thomas M. Isaacson

(57) ABSTRACT

The invention relates to systems, methods and computer-readable media for using system jobs for performing actions outside the constraints of batch compute jobs submitted to a compute environment such as a cluster or a grid. The method for modifying a compute environment from a system job comprises associating a system job to a queueable object, triggering the system job based on an event and performing arbitrary actions on resources outside of compute nodes in the compute environment. The queueable objects include objects such as batch compute jobs or job reservations. The events that trigger the system job may be time driven, such as ten minutes prior to completion of the batch compute job, or dependent on other actions associated with other system jobs. The system jobs may be utilized also to perform rolling maintenance on a node by node basis.

16 Claims, 4 Drawing Sheets

U.S. PATENT DOCUMENTS

| | | | |
|---|---|---|---|
| 6,496,872 B1* | 12/2002 | Katz et al. | 719/318 |
| 6,629,148 B1* | 9/2003 | Ahmed et al. | 709/238 |
| 6,971,098 B2* | 11/2005 | Khare et al. | 718/101 |
| 7,082,606 B2* | 7/2006 | Wood et al. | 718/102 |
| 7,293,092 B2* | 11/2007 | Sukegawa | 709/226 |
| 7,334,230 B2* | 2/2008 | Chung et al. | 718/104 |
| 7,337,446 B2* | 2/2008 | Sankaranarayan et al. | 719/318 |
| 7,356,655 B2* | 4/2008 | Allen et al. | 711/153 |
| 7,376,693 B2* | 5/2008 | Neiman et al. | 709/201 |
| 7,437,460 B2* | 10/2008 | Chidambaran et al. | 709/226 |
| 7,516,221 B2* | 4/2009 | Souder et al. | 709/226 |
| 2002/0120741 A1 | 8/2002 | Webb et al. | |
| 2003/0120704 A1 | 6/2003 | Tran et al. | |
| 2004/0194098 A1* | 9/2004 | Chung et al. | 718/100 |
| 2004/0215780 A1* | 10/2004 | Kawato | 709/226 |
| 2005/0038835 A1* | 2/2005 | Chidambaran et al. | 707/203 |
| 2005/0044205 A1* | 2/2005 | Sankaranarayan et al. | 709/223 |
| 2005/0120160 A1* | 6/2005 | Plouffe et al. | 711/1 |
| 2005/0210470 A1* | 9/2005 | Chung et al. | 718/100 |
| 2005/0278760 A1 | 12/2005 | Dewar et al. | |
| 2005/0283534 A1* | 12/2005 | Bigagli et al. | 709/229 |
| 2005/0283782 A1* | 12/2005 | Lu et al. | 718/100 |
| 2006/0015773 A1* | 1/2006 | Singh et al. | 714/13 |
| 2006/0048157 A1* | 3/2006 | Dawson et al. | 718/104 |

OTHER PUBLICATIONS

Chase et al. "Dynamic Virtual Clusters in a Grid Site Manager", 2003 IEEE, 11 pages.*

Jarek Nabrzyski, Jennifer M. Schopf and Jan Weglarz, "Grid Resources Management, State of the Art and Future Trends", Kluwer Academic Publishers, 2004.

Edited by William Gropp, Ewing Lusk and Thomas Sterling, "Beowulf Cluster Computing with Linux", Massachusetts Institute of Technology, 2003.

* cited by examiner

US 8,271,980 B2

SYSTEM AND METHOD OF PROVIDING SYSTEM JOBS WITHIN A COMPUTE ENVIRONMENT

PRIORITY CLAIM

The present application claims priority to U.S. Provisional Application No. 60/625,894, Filed Nov. 8, 2004, the contents of which are incorporated herein by reference.

BACKGROUND

1. Technical Field

The present disclosure relates to managing a compute environment or more specifically to a system and method of modifying or updating a compute environment using system jobs. One embodiment of the disclosure relates to rolling maintenance on a node-by-node basis within the compute environment.

2. Introduction

The present invention relates to a system and method of managing resources in the context of a compute environment which may be defined as a grid or cluster of computers. Grid computing may be defined as coordinated resource sharing and problem solving in dynamic, multi-institutional collaborations. Many computing projects require much more computational power and resources than a single computer or computer processor can provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring compute resources over time in order to run applications or compute jobs as efficiently as possible. Each project will utilize a different set of resources and thus is typically unique. In addition to the challenge of allocating resources for a particular job, administrators also have difficulty obtaining a clear understanding of the resources available, the current status of the environment and available resources, and real-time competing needs of various users. General background information on clusters and grids may be found in several publications. See, e.g., *Grid Resource Management. State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will comprise a plurality of clusters as will be shown in FIG. 1. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a plurality of resource managers 106A, 106B and 106C. Each resource manager communicates with a series of compute resources shown as nodes 108A, 108B, 108C, 108D, 108E, 108F, 108G, 108H, 108I.

Local schedulers (which may refer to the cluster schedulers 104A, 104B, 104C or the resource managers 106A, 106B, 106C) are closer to the specific resources 108 and may not allow grid schedulers 102 direct access to the resources. The resources are grouped into clusters 110, 112 and 114. Examples of cluster resources include data storage devices such as hard drives, compute resources such as computer processors, network resources such as routers and transmission means, and so forth. The grid level scheduler 102 typically does not own or control the actual resources. Therefore, compute jobs are submitted from the high level grid-scheduler 102 to a local set of resources with no more permissions that the user would have. Compute jobs may also be submitted at the cluster scheduler layer of the grid or even directly at the resource managers. There are problems with the efficiency of the arrangement.

The heterogeneous nature of the shared resources causes a reduction in efficiency. Without dedicated access to a resource, the grid level scheduler 102 is challenged with the high degree of variance and unpredictability in the capacity of the resources available for use. Most resources are shared among users and projects and each project varies from the other. The difference in performance goals for various projects also reduces efficiencies. Grid resources are used to improve performance of an application but the resource owners and users have different performance goals: from optimizing the performance for a single application to getting the best system throughput or minimizing response time. Local policies may also play a role in performance.

FIG. 2 illustrates a current state of art that allows a scheduler/resource manager combination to submit and control standard batch compute jobs. An example of a batch job is a request from a weather service to process a hurricane analysis. The amount of computing resources are large and therefore the job is submitted to a cluster for processing. A batch job is submitted to the queue of a resource manager and is constrained to run within the cluster associated with that resource manager. A batch job 204, 206 or 208 within a queue 202 has the ability to have a number of steps in which each step may have dependencies on other steps, successful or failed completion of previous steps or similar relationships. The bounds of influence for the batch jobs are limited to running non-root applications or executables on that cluster or on compute nodes that are allocated to it.

The respective batch job is unable to do anything outside of the constrained space for the job. There are a number of deficiencies with this approach, particularly in that such a job is unable to modify the scheduling environment. The job is only able to operate within the scheduling environment and it is also constrained to only doing the specified actions. For example, the job may be constrained to run an executable within a compute node of the cluster (within its allocated space), but it is unable to run any other action within the cluster or within the other services of the cluster.

What is needed is a method by which a processing entity that can be queued can be submitted to the scheduler that can be more flexible and have a broader scope of impact on the compute environment.

SUMMARY

Additional features and advantages of the disclosure will be set forth in the description which follows, and in part will be obvious from the description, or may be learned by practice. The features and advantages of the disclosure may be realized and obtained by means of the instruments and combinations particularly pointed out in the appended claims.

These and other features of the present disclosure will become more fully apparent from the following description and appended claims, or may be learned by the practice as set forth herein.

The invention relates to systems, methods and computer-readable storage media for using system jobs for performing actions outside the constraints of batch compute jobs. System jobs may be conceptually thought of as intelligent agents. Typically, controlling and managing the resources within a compute environment such as a cluster or a grid are tasks performed by a scheduler or other management software. No actions, provisioning or reservations are made outside of the control of this software. The invention disclosure provides increased flexibility in managing and controlling the environment by using entities that are called system jobs that can include triggered events that are outside of events managed by a scheduler. Other concepts that apply to system jobs include state, retry capability, steps, time steps and dependencies.

As an example, the method embodiment of the disclosure includes a method for modifying a compute environment from a system job by associating the system job to a queuable object, triggering the system job based on an event and performing arbitrary actions on resources in the compute environment. The queuable objects include objects such as batch compute jobs or job reservations. The events that trigger the system job may be time driven, such as ten minutes prior to completion of the batch compute job, or dependent on other actions associated with other system jobs.

Another embodiment of the disclosure relates to performing a rolling maintenance on a compute environment. A method of performing rolling maintenance on a node within a compute environment comprises receiving a submission of a system job associated with a node, performing a provisioning operation on the node, determining whether the provisioning was successful (health check) and if provisioning was successful, then terminating the system job leaving the node available for use in the compute environment. If the provisioning was not successful, the system job reports an unsuccessful status via means such as an email to an administrator and creates a reservation for the node. Provisioning a node can involve updating software, provisioning an operating system or any other operation that may be performed on that node. The operation on each node is performed on a node by node basis independently and a time associated with the process may be an earliest possible time, a scheduled time or an earliest possible time after a predetermined period of time. System jobs may be submitted at both a grid level and a cluster level within a compute environment.

BRIEF DESCRIPTION OF THE DRAWINGS

In order to describe the manner in which the above-recited and other advantages and features of the disclosure can be obtained, a more particular description of the invention briefly described above will be rendered by reference to specific embodiments thereof which are illustrated in the appended drawings. Understanding that these drawings depict only typical embodiments and are not therefore to be considered to be limiting of its scope, the disclosed concept will be described and explained with additional specificity and detail through the use of the accompanying drawings in which.

DETAILED DESCRIPTION

Figure 1:
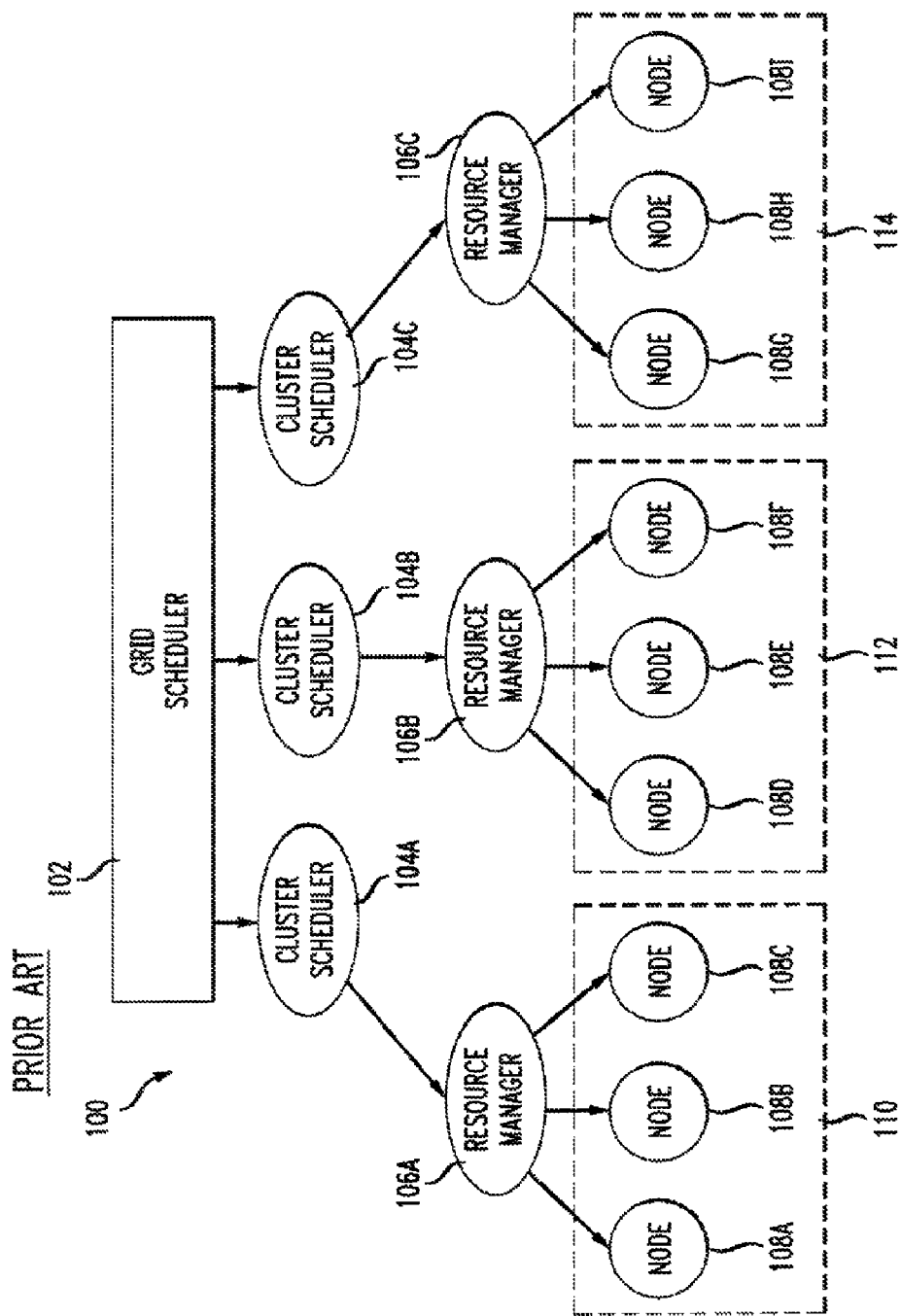
FIG. 1 illustrates generally a grid scheduler, cluster scheduler, and resource managers interacting with compute nodes.
Figure 2:
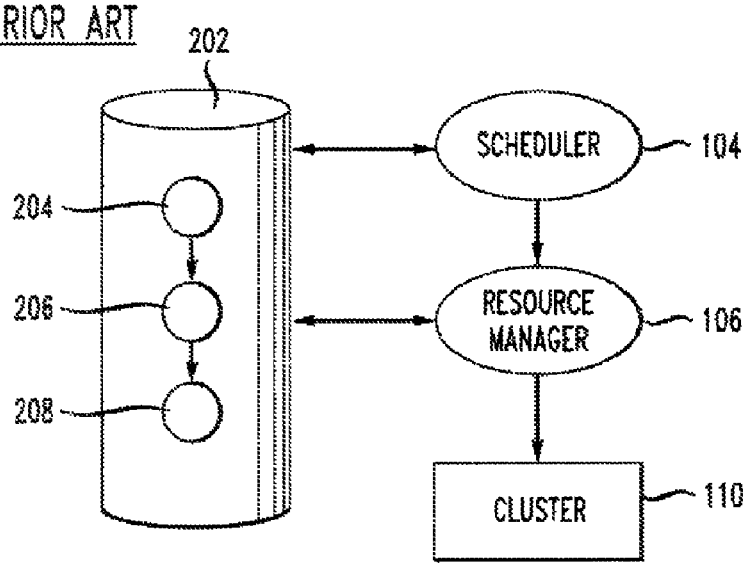
FIG. 2 illustrates a prior art submission of a batch job for processing in a compute environment.

Various embodiments are discussed in detail below. While specific implementations are discussed, it should be understood that this is done for illustration purposes only. A person skilled in the relevant art will recognize that other components and configurations may be used without parting from the spirit and scope of the invention.

The present disclosure provides an improvement over the prior art by enabling system jobs or other processing entities that can be queued for processing in a compute environment to perform arbitrary actions on resources outside the compute nodes in the environment. Furthermore, the computing device performing the steps herein causes actions to be taken associated with the submitted job outside the previously constrained space.

Embodiments of the disclosure relate to system jobs, and systems of creating and using system jobs, methods of creating and using system jobs, computer-readable storage media for controlling a computing device to manage system jobs and a compute environment operating according to the principles disclosed herein. As introduced above, one example of a job is a consume job that consumes resources for a particular project, such as a weather study. The present disclosure provides for a different type of job that is flexible and performs other operations and/or modifications in the compute environment. System jobs can be created and/or submitted remotely or internally within a compute environment and can spawn child operations into a resource manager but the master job resides strictly within the workload manager and/or scheduler. System jobs will preferably contain one or more steps with dependencies.

Each step that is involved in processing a system job may consist of one or more tasks where each task modifies the internal or external environment of the compute environment or the job. Internal environment changes include, but are not limited to: creating reservations, setting variables, modifying credentials, policies, thresholds, priorities, etc. External changes include modifying resources, database settings, peer interfaces, external credentials, launching arbitrary scripts, launching applications, provisioning resources, etc.

A system job may require several steps to complete its process and terminate. Throughout this process, at various stages, a state of a particular task needs to be identified. Step state is based on success or failure of task execution. Steps may possess triggers. Steps may generate and consume job level and global level variables. Step dependencies may be based on internal or external factors including, but not limited to: job, step, trigger, time, or environment based dependencies. Time dependencies may be based on absolute time, or time relative to some job internal or external event. Dependencies may include local or global variable settings. Dependencies may be based on return value of arbitrary configurable probes.

Steps may optionally allocate resources. Steps may optionally be associated with a walltime. There are several differentiators associated with system jobs. They allow at least one of: (1) integration of environmental data into job flow decisions; (2) creation of arbitrary probes, continuous task retry, etc.; (3) integration of environment data into task execution; (4) dynamic resource reallocation based on results of previous tasks; (5) integration of compute tasks, tasks involving non-compute resources (i.e. data bases, provisioning systems, data managers, etc), and changes to compute environment meta data (such as policies, thresholds, priorities, credential configuration, etc); (6) access to live global cluster and job centric information, information; (7) envelopment of traditional compute tasks in higher layer wrappers; (8) allowing greater environment management; (8) synchronization of tasks managing unrelated resources and resource types; (9) co-allocation of resources and requirements, scheduling, reservation; (10) guarantees of completion for loose aggregations of request types application of tight and loose time constraints on requests (including periodic window, timeframe proximity, and deadline based constraints); and (11) optimization of loose aggregations of requests.

System jobs are also referred to as workload management object event policies. The purpose of a workload management object event policy is to allow or cause actions to be associated with a workload management object such as a reservation, a compute/system job, a node, a cluster, a user, a resource manger and/or other queue-able workload units that trigger a given action either based on a time criteria or other measurable condition. An example of this can be a system/compute job having an associated event policy that launches a script 10 minutes prior to job completion. This script could send an e-mail to the user notifying them that the job is almost finished, or it can set in action the launch of another job that has a dependency on the results of the initial job being mostly complete. Another example is that of a reservation with an associated event policy that deletes temporary files and restarts all of the reserved nodes to purge them of sensitive data and to clear memory prior to usage by another entity.

An example of the method aspect of the disclosure includes the steps of receiving a request for the creation of an entity to manage or perform at least one operation within a compute environment. The entity is preferably a system job as described herein. The method further includes creating the entity, wherein the entity has arbitrary dependencies, associating the entity with a workload management object and using the entity to perform at least one operation and/or modification on the compute environment.

Figure 3:
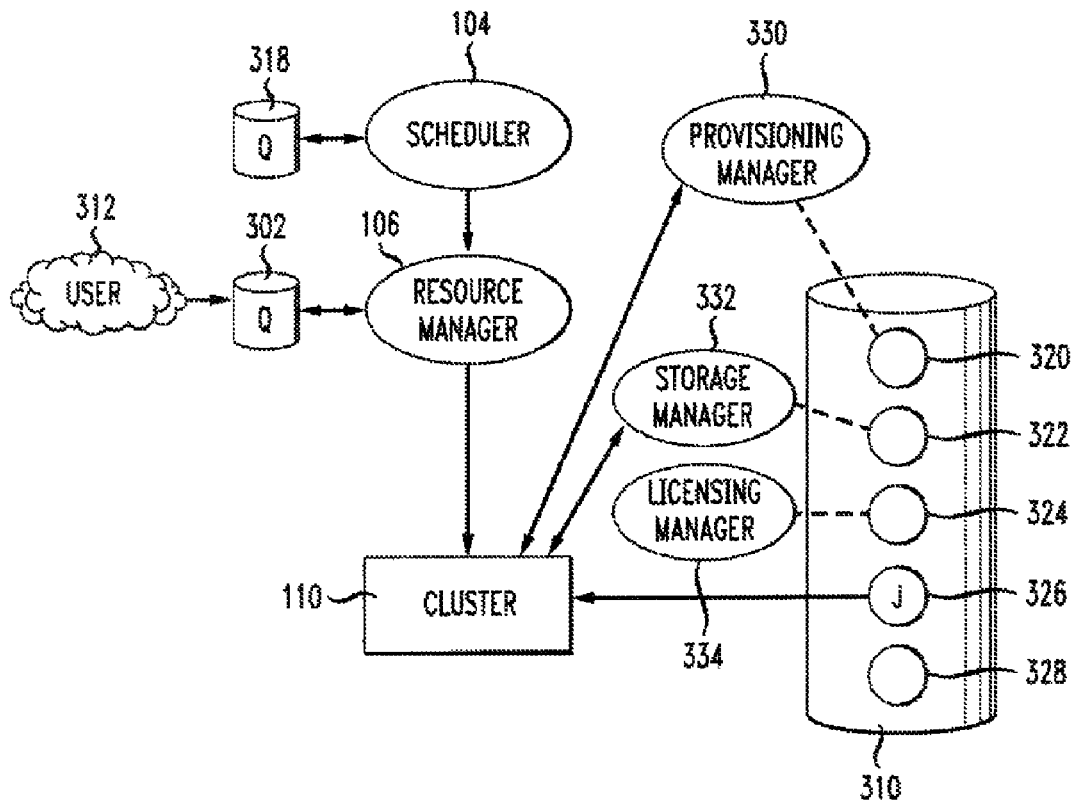
FIG. 3 illustrates the use of system jobs in an architecture according to an aspect of the disclosure.

FIG. 3 illustrates an example of how a system job 326 can be used to set up a virtual private cluster or a job-specific virtual cluster. In FIG. 3, the user 312 submits a job 326 via a queue 302 to a resource manager 106. A queue 318 is also shown as having jobs submitted to the scheduler 104. The queue 310 illustrates in more detail a compute job and system jobs associated with it that will be processed on the cluster 110. While the job 326 is submitted by the user 312, the associated system jobs can be selected by the user 312 or via an automatic process that receives some input from the user 312 and also can reference policy information or service level agreement information to generate system jobs to help to monitor and manager the compute environment for the submitted job 326.

The job steps discussed and the functions performed that are associated with the job can be arbitrary. The concrete examples illustrate how the arbitrary capabilities can be applied. A queue 310 holds a system job 326 and a number of other job steps 320, 322, 324, 328. The first job step 320 involves contacting not the cluster but a provisioning manager 330 to set up a compute environment. The subsequent job step 322 arranges for storage management with a storage manager 332; the third job step 324 contacts a license manager 334 to make sure the applications that are needed are available. The fourth step 326 executes the actual job in the virtual environment 308 and the final step 328 involves staging the data out of this environment and destroying or collapsing the virtual cluster.

The above example illustrates the operation of system jobs where there could be any combination of the various tasks associated with a system job. System jobs have a number of distinct differences from standard consume jobs 326. A system operating under the principle described herein provides full support meaning that jobs allow arbitrary dependencies and combinations or relationships between job steps. They also allow arbitrary actions in which arbitrary things can be executed, arbitrary services can be driven, arbitrary data can be modified, arbitrary policies and configurations of the scheduler can be adjusted. They can be set to require resource allocation and can be set up so they only come live when those resources can be allocated and dedicated to the system job. They also have the ability to have arbitrary impact on the system.

Figure 4:
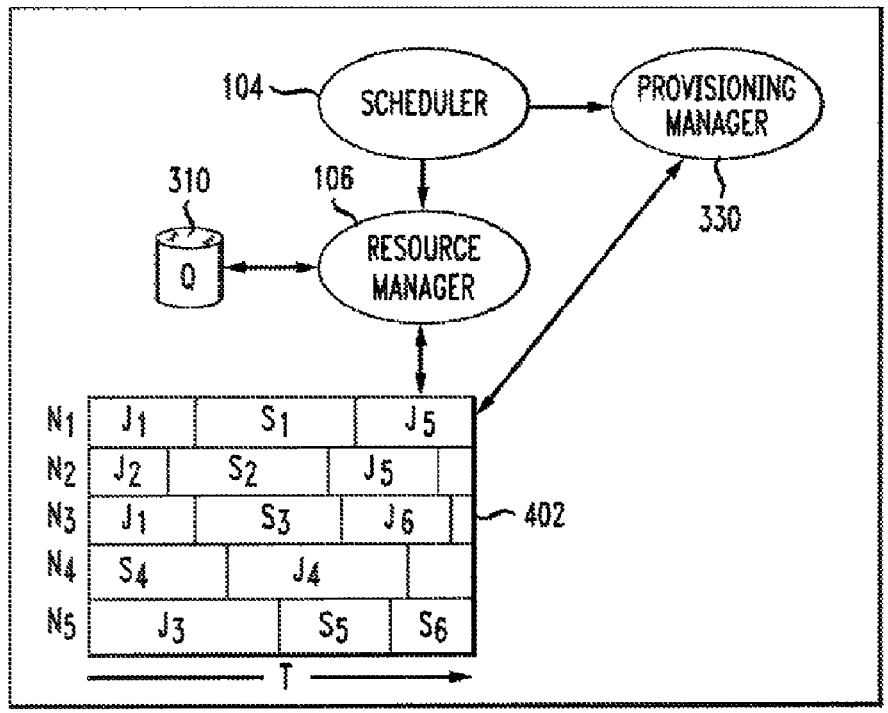
FIG. 4 illustrates the use of system jobs in a cluster of nodes.

FIG. 4 shows an example of using a system job to perform a rolling maintenance. Rolling maintenance can include updating a nodes software, performing rolling provisioning, patches and software upgrades as well as other functions. In a rolling maintenance, a site has a desire to either check or change current applications, operating systems or kernel versions in their compute nodes or other cluster resources. For example, assume that a compute node needs to have software reinstalled and updated. Previously, this process would be done by taking the entire node down after all the jobs assigned to that node are complete, making the system unavailable, installing by hand all the nodes with the new level of software and once checks are made turning all nodes back to the users to continue running jobs. This process is made more efficient by the application of system jobs.

Cluster 402 of FIG. 4 illustrates a series of jobs 1-6 running some of the nodes 1-5 with time along the X axis. As shown, node 1 is currently running job 1 and in some time in the future, job 1 will complete and a system job 1 will operate for some time, followed by job 5. Some of these nodes are currently empty, namely node 4 which is running system job 4. When the administrator actually schedules the system job, the system preferably identifies the earliest time that the job could occur on each node. The system job can also be modified to identify any particular time to begin, i.e., it may be instructed to find the earliest time starting one week from today, an earliest possible time from any predetermined time or a scheduled time. For example, on node 4 the job can start immediately, which it does, and then update that node and turns it over to run job 4 which automatically happens as soon as it completes its health and sanity check.

Cluster 402 of FIG. 4 illustrates a series of jobs 1-6 running some of the nodes 1-5 with time along the X axis. As shown, node 1 is currently running job 1 and in some time in the future, job 1 will complete and a system job 1 will operate for some time, followed by job 5. Some of these nodes are currently empty, namely node 4 which is running system job 4. When the administrator actually schedules the system job, the system preferably identifies the earliest time that the job could occur on each node. They system job may also be modified to identify any particular time to begin, i.e., it may be instructed to find the earliest time starting one week from today, an earliest possible time from any predetermined time or a scheduled time. For example, on node 4 the job can start immediately, which it does, and then update that node and turns it over to run job 4 which automatically happens as soon as it completes its health and sanity check.

On other nodes the system job is scheduled for immediate processing upon completion of existing workloads. The update is completed as soon as possible and the node is again automatically turned over to user access and jobs (shown as job 6) can begin or continue to run. The system jobs principle takes advantage of the fact that the system jobs are actually not running out on the compute host (the cluster). When a system job requires allocation of a resource such as node 1, as soon as node 1 is available, the job launches a request to the provisioning service 330. The provisioning service 330 then updates the node as necessary to handle the job. As soon as that step of the system job is complete, a health check trigger is launched verifying the node is operational. If the health check trigger is successful, the node if freed and the system job is canceled. If the health check is unsuccessful, an e-mail is sent out and the node is reserved indefinitely. The e-mail is sent to the administrator so he or she can correct whatever problems occurred. In a similar case, in all cases the system job is not actually run on the compute host even though the compute host is allocated and impacted by the system job.

Figure 5:
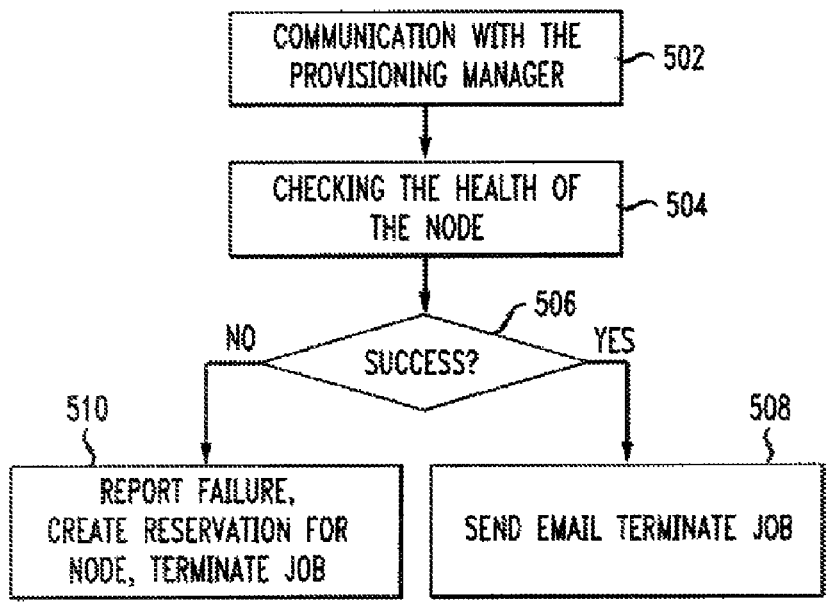
FIG. 5 illustrates a method embodiment of the disclosure.

FIG. 5 illustrates the method aspect of the disclosure related to the use of a system job required for maintenance. The method includes a number of steps performed by the system job. The first step includes the system job transmitting a communication to the provisioning manager to provision an allocated resource (502). Each system job will have a requirement for a specific node. For example, in the example shown in FIG. 5, the system job requires that the system job only runs with regard to node 1 because it requires node 1. The job is not available to start until the node is allocated and dedicated to this job. Once that job runs, it uses the provisioning manager to provision a particular operating system (or for some other provisioning need) that has been requested.

Next, the method includes running a script that communicates with the node to verify that the provisioning step was properly carried out and that the node is healthy (504). If step 504 reports success (506), then the system job sends and e-mail and terminates the job (508) thus allowing other compute jobs to immediately use the node within the cluster. If step (504) fails (506), then the system job reports the failure, and creates a system reservation for the node, and terminates the job (510) leaving the node in a reserve state until an administrator can respond to the failure and correct the operating system. This example was the application of a system job to allow for rolling maintenance.

Next, the method comprises running a script that communicates with the node to verify that the provisioning step was properly carried out and that the node is healthy (504). If step 504 reports success (506), then the system job sends and e-mail and terminates the job (508) thus allowing other compute jobs to immediately use the node within the cluster. If step (504) fails (506), then the system job reports the failure, and creates a system reservation for the node, and terminates the job (510) leaving the node in a reserve state until an administrator can respond to the failure and correct the operating system. This example was the application of a system job to allow for rolling maintenance.

Jobs associated with rolling maintenance that are scheduled are not a resource manager process. They are higher level jobs that perform arbitrary tasks outside processes handled by the resource manager. A trigger is a subset of a system job and has dependencies and can interface with web services, local processes, socket interfaces and can manage priorities. This allows an administrator to have the workload manager not being tied to a resource manager. The administrator can schedule a file system backup (e.g., job 1 and 2 will use the file system and job 3 will back up the file system). The scheduler typically has a locked model where the scheduler only knows about the resource manager.

Figure 6:
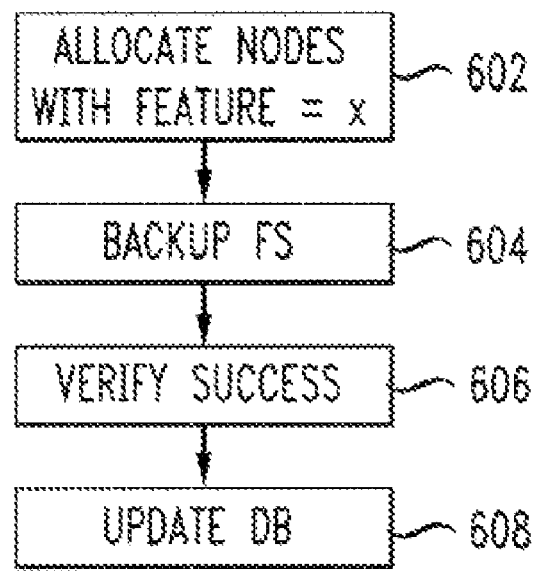
FIG. 6 is a flowchart illustrating an example embodiment of the disclosure.
Figure 7:
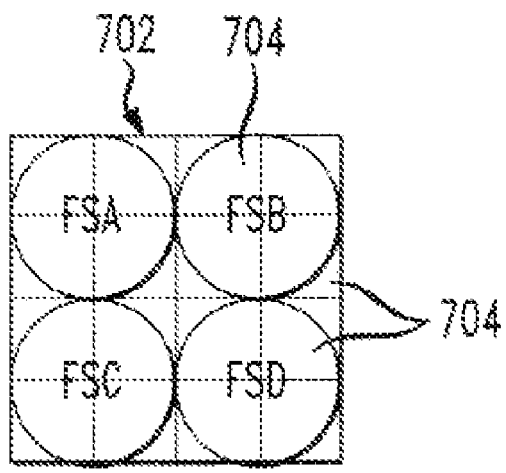
FIG. 7 illustrates a cluster with files system spanning multiple nodes.

FIG. 6 shows another use of a system job, in particular for backing up a file system. In this particular situation, assume that a cluster has a number of file systems available and they are available across a parallel set of nodes. This scenario is illustrated in FIG. 7 in cluster 702 having a variety of sixteen nodes 704 with file system A (FSA), file system B (FSB), file system C (FLC), and file system file system D (FSD). There are four nodes associated with each file system. Suppose the site has a goal of backing up each file system and in order to do that, it must quiesce each individual file system so that there is no activity when it is backed up. To quiesce each file system means to terminate activity thus allowing aspects of a parallel system to come to a completed state. When a system is quiesced, previously planned transmissions and signals are all delivered and activity is allowed to stop in a natural manner.

To accomplish this set of requirements, an object is created that submits a series of system jobs. The first system job requests allocation of all four nodes associated with file system A (602). This is performed using a feature requirement. Once it has all the nodes dedicated, the first step is that it issues a communication to the backup file system which backs up the file system (604). When that completes, the system job verifies the success of the process (606). In this case, regardless of whether the back was successful, the job reports the verification information and updates the database recording that information and then terminates allowing the nodes to be used by the user (608).

It is possible to modify the scenario slightly in which the file system must be quiesced. The file system can be quiesced for a period of time before everything synchronizes. Within a system job, it is possible to have the ability or step to force a duration, a step can either complete when its task is complete or when a duration has been reached. Therefore, this example could be modified so that step (602) simply to allocate the resources and quiesce them for a period of 10 minutes to allow full synchronization of the parallel aspects followed by the backup step (604) and step (606) which determines the success of the process, and wherein step (608) which updates the database with the success status.

To create a system job there are a number of different models. A system job can be automatically created by submitting a standard job to a particular quality of service where the quality of service requires enablement of special services such as automatic provisioning or dedicated network bandwidth. In such a case, the user submits a standard job with a selected quality of service. For example assume a user submits a job with a quality of service related to a dedicated bandwidth. With such a request, the scheduler would take the job request and encapsulate it in a system job. The first step in a system job 1 is to identify the resources and then communicate with the network manager to dynamically partition the network so as to provide the guaranteed bandwidth. Once that is completed, the system job will proceed to allow the submitted job to process.

The same model is also used to allow data stage-in, data stage-out and have tightly coordinated resource usage after the environment is set up. The system jobs allow one to have a tight time frame control. Without system jobs, normal performance job steps causes one step to follow the next step but does not constrain how tightly the second step must follow. A system job can tightly constrain steps such that a subsequent job will run immediately following the first job thus allowing chaining of a prerequisite job and post requisite steps. In the situation of a rolling maintenance, within the graphical user interface, a user does not even need to be aware that the system job exists. In most cases, system jobs run "under the covers" to enable outlying functionality. An administrator can indicate in a graphical interface to run a particular script on all nodes which will automatically install the application. The administrator can also indicates that the application will be updated on all nodes using a cluster provisioning manager. The rest of the steps are done automatically without the administrator's knowledge.

An important attribute of system jobs is that a system job is queueable. A system job can have dependency on types of resources, dependency on other system jobs or batch compute jobs. System jobs can incorporate dynamic content sensitive triggers, which allow them to customize the environment or customize the general local scheduling environment. The steps in a system job may or may not have a duration, and they may or may not have a resource allocation or a resource co-allocation. They do have the ability to perform arbitrary execution or use arbitrary services. For example, system jobs can tap in and activate services such as a peer-to-peer service or a resource manager. Furthermore, system jobs can be reserved and can have relative or absolute priority.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. A computer readable storage medium is limited to hardware storage such as RAM, ROM, hard drives and the like and expressly excludes wireless interfaces or signals per se. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method for managing a multi-node compute environment, the method comprising:
    associating a system job to a compute job that is scheduled according to a reservation to consume resources in a multi-node compute environment under common management; and
    performing an action on a resource within the multi-node compute environment by processing the system job, the performed action being associated with actions other than (1) establishing any kind of reservation for resources to be consumed by the compute job and (2) directly dispatching and executing the compute job in the multi-node compute environment.

2. The method of claim 1, wherein the system job has at least one attribute selected from a list comprising event type, timeout, offset, action, dependency, argument list, state and threshold.

3. The method of claim 2, wherein the event type is at least one of a cancel, state and create event type.

4. The method of claim 1, wherein performing the action is based on a time offset associated with the beginning or completion of the compute job.

5. The method of claim 1, wherein performing the action comprising measuring a condition within the multi-node compute environment.

6. The method of claim 1, further comprising, after performing the action:
    performing a health check of resources affected by the performed action.

7. The method of claim 6, wherein if the health check indicates that the resources affected by the performed action are operational, releasing the resources for use in the multi-node compute environment for batch compute jobs.

8. The method of claim 6, wherein if the health check indicates that the resources affected by the performed action is not operational, sending a message to an administrator.

9. The method of claim 1, wherein performing the action is triggered by an event associated with a second system job.

10. The method of claim 9, wherein the event associated with the second system job is the completion of the second system job.

11. The method of claim 1, wherein performing the action is dependent on a second system job.

12. A system for managing a multi-node compute environment, the system comprising:
    a processor;
    a first module the processor to associate a system job to a compute job that is scheduled according to a reservation to consume resources in a multi-node compute environment; and a second module controlling the processor to perform an action on a resource within the multi-node compute environment by processing the system job, the performed action being associated with actions other than (1) establishing any kind of reservation for resources to be consumed by the compute job and (2) directly dispatching and executing the compute job in the multi-node compute environment.

13. The system of claim 12, wherein the second module further performs the action based on a time offset associated with a beginning or a completion of the compute job.

14. A non-transitory computer-readable storage medium storing instructions for managing a multi-node compute environment, the instructions comprising:

associating a system job to a compute job that is scheduled according to a reservation to consume resources in a multi-node compute environment; and performing an action on a resource within the multi-node compute environment by processing the system job, the performed action being associated with actions other than (1) establishing any kind of reservation for resources to be consumed by the compute job and (2) directly dispatching and executing the compute job in the multi-node compute environment.

15. The non-transitory computer-readable storage medium of claim 14, wherein the instruction that performs the action is based on a time offset associated with the beginning or the completion of the compute job.

16. The non-transitory computer-readable storage medium of claim 14, wherein performing the action is triggered by an event associated with a second system job.

* * * * *